Feb. 7, 1967 C. A. BEHNEY 3,302,646
APPARATUS FOR TREATING EYE INFECTION
Filed Jan. 10, 1964
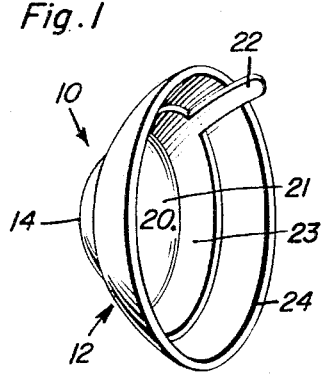
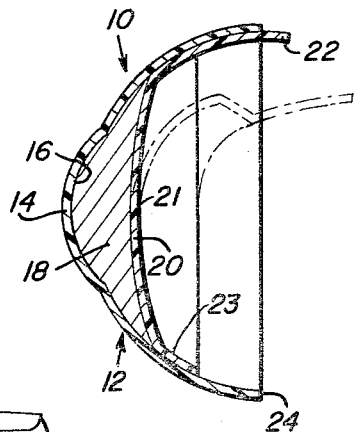
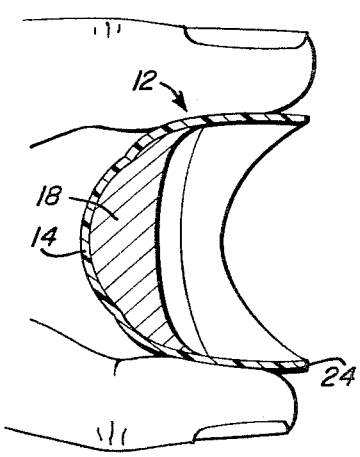
Fig. 3
Compressed for insertion
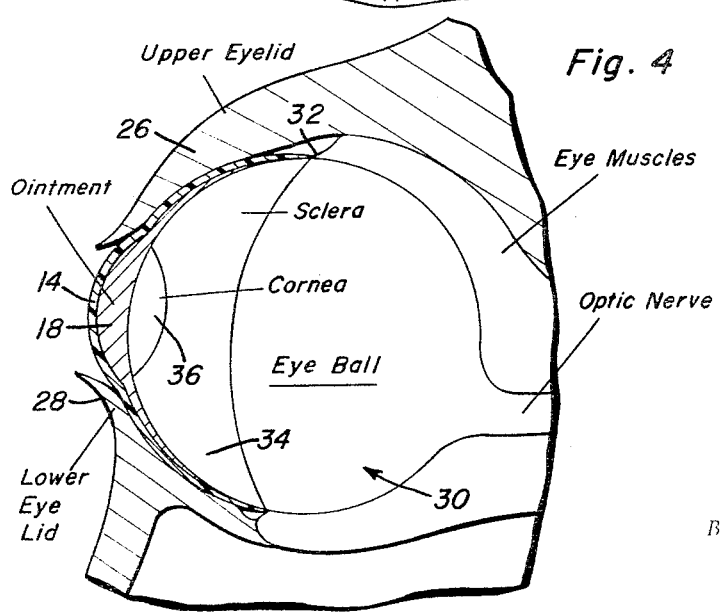
Fig. 4
Charles A. Behney
INVENTOR.
BY *Clarence A. O'Brien*
*and Harvey B. Jacobson*
Attorneys

United States Patent Office

3,302,646
Patented Feb. 7, 1967

3,302,646
APPARATUS FOR TREATING EYE INFECTION
Charles A. Behney, Cochise Lane, Bisbee, Ariz. 85603
Filed Jan. 10, 1964, Ser. No. 337,053
1 Claim. (Cl. 128—260)

This invention relates to the treatment of eye infections and more particularly to the treatment of infectious keratitis in bovine eyes.

The present invention is concerned with an eye disease which commonly plagues white-faced cattle known as infectious keratitis characterized by an acute, sub-acute of chronic infection of the cornea of the eye. The symptoms of this disease include irritation, infection and/or ulceration of the cornea frequently involving the sclera, conjunctiva and later the interior of the eyeball. Treatment of this eye disease by use of antibiotic ointments is presently ineffective inasmuch as the eye remains exposed to physical irritants such as wind, dust, chemicals and other foreign bodies as well as irritating radiations such as ultra-violet rays. Furthermore, any medication applied is promptly washed out by the tears of the animal so as rapidly to terminate any treatment applied or require continuous application of medication.

It is therefore a primary object of the present invention to provide an apparatus whereby treatment of eye infections as aforementioned may be effected for prolonged periods of time necessary to produce the cure without requiring the constant attention of the person applying the treatment.

Another object of the present invention is to provide an apparatus for treating eye diseases such as infectious keratitis in cattle and by means of which the eye being treated may be protected from all types of irritants during the treating period as long as necessary.

A still further object of the present invention is to provide an apparatus which is expressly designed to treat bovine eye diseases and is capable of being readily applied and removed and re-used as needed.

These together with other objects and advantages which will become subsequently apparent reside in the details of construction and operation as more fully hereinafter described and claimed, reference being had to the accompanying drawings forming a part hereof, wherein like numerals refer to like parts, throughout, and in which:

FIGURE 1 is a perspective view of the apparatus utilized in accordance with the present invention.

FIGURE 2 is a side sectional view of the apparatus of FIGURE 1.

FIGURE 3 is a side sectional view of the apparatus prepared for insertion beneath the eyelid of the animal eye.

FIGURE 4 is a sectional view showing the apparatus installed over the eyeball of an animal eye during treatment thereof.

Referring now to the drawings in detail, it will be observed that the product of the present invention generally referred to by reference numeral 10 in FIGURES 1 and 2 includes a cup-like shield generally referred to by the reference numeral 12. The shield 12 is made of a thin flexible material such as a molded polyethylene plastic which is insoluble under the temperature and chemical conditions to which it is subjected. The shield 12 in its un-deformed condition is provided with a curvature substantially conforming to but slightly less than the curvature of the eyeball portions exposed through and covered by the eyelids except for a central portion 14 which deviates from the curvature and forms a pocket 16. Disposed within the pocket, is a fluent medication in the form of an antibiotic cortisone ointment 18. The ointment is retained in the pocket, prior to use of the apparatus, by means of a plastic sealing member or retainer 20 having an adhesive on the surface portion thereof contacting the inside surface of the shield 12. A pull tab 22 is provided so as to permit removal of the retainer 20 prior to insertion of the shield 10 beneath the eyelids of the eye to be treated. As shown in the drawings, the cup-shaped retainer embodies a imperforate bottom wall 21 which is of substantially circular configuration, projects across the pocket 16, and, in combination therewith, defines a sealed chamber for the ointment. The retainer also embodies a continuous, substantially frusto-spherical side wall 23 which is disposed in contiguity with the inner surface of the rim region 24 of the shield. The aforementioned adhesive is applied to and covers the outer surface portion of said side wall 23 and the pull tab 22 is formed with the free rim or edge portion of said side wall and projects away from the bottom wall 21.

After the retainer 20 is removed from the shield, the shield 10 may be compressed to the condition illustrated in FIGURE 3 for example, so as to permit insertion of the rim region 24 beneath the eyelids 26 and 28 associated with the eyeball 30 as illustrated in FIGURE 4. It will therefore be observed, that when the shield is inserted, said rim region 24 of the shield will extend up to the attachment area 32 between the conjunctiva to the sclera 34 of the eyeball, the conjunctiva being the eyelid membrane which partially covers the sclera. In this manner, the shield will slightly clear the external surface of the eyeball which is either exposed between the eyelids or covered by the eyelids and thereby spread and seal the ointment 18 over all infected portions of the eyeball. Accordingly, it will be observed from FIGURE 4, that the central portion 14 of the shield is aligned with the cornea 36 of the eyeball in order to establish a reservoir for and hold the bulk of the ointment thereover while allowing some of the ointment to spread over the sclera beyond the outer confines of the cornea. The shield will also prevent the spread of infectious keratitis by preventing any infected tears from passing into the lachrymal duct and draining thereof through the nasal lachrymal duct dropping them to the ground. Also, inasmuch as the flexible plastic material from which the shield member is made, is insoluble, the eyeball may be maintained coated with the medication 18 under the body temperature conditions of the animal as long as needed. Neither the body heat nor the liquid tears will be effective to dissolve the shield material.

In addition to the aforementioned functions of the shield 12, it will also be apparent that the shield member will prevent penetration of physical irritants such as wind, dust, chemical and other foreign bodies that would otherwise enter the eyes. Also, in order to avoid exposure of the eyes during the treating period to irritating radiations such as ultra-violet rays, the material of the shield member 12 will be tinted by a blue color for example, so as to filter out such radiations.

From the foregoing description, the construction and use of the apparatus of the present invention will be apparent. It will therefore be appreciated that the apparatus may be readily prepared for insertion between the eyelids of the restrained animal after removal of the seal member 20, by compressing the shield member. Upon release of the shield member, it will assume its undeformed condition covering the eyeball as illustrated in FIGURE 4 with the eyelids holding the shield member in place and the medication 18 in constant contact with the inflamed cornea. The shield 12 is made of a material tolerable to the eye of the animal causing no discomfort to the animal as well as relieving pain by shielding the eye from irritants as aforementioned. Because of the insoluble nature of the shield, it may be held in place as long as needed or until healing has occurred during which time any tearing will run on the outside of the apparatus leaving the ointment in constant contact with the eye. The covering shield 12 will therefore be made in different sizes so as to accommodate cattle of different ages and sizes. Also, the shield may be re-used by merely cleaning after each treatment. The eye treating apparatus will also permit movement of the eyeball inside of the shield and be translucent so that the cornea may be observed, although tinted blue so as to filter out irritating radiation as aforementioned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

An apparatus for treating eye infection of animals comprising, a cup-like shield made of an insoluble, flexible material having an undeformed curvature of slightly less than the curvature of the cornea and sclera up to the attachment of the conjunctiva thereto, the rim region of said shield being adapted for insertion into the eye socket between the eyelids and the sclera, a central portion of the shield deviating from said curvature to project between the eyelids and form a pocket aligned with the cornea, a therapeutic ointment contained in and substantially filling said pocket, a cup-shaped retainer removably disposed within said shield and disposed within the confines thereof, said retainer having an imperforate bottom wall of substantially circular configuration projecting across said pocket and, in combination therewith, defining a sealed chamber for the ointment, and a continuous substantially frusto-spherical side wall disposed in contiguity with the inner surface of said rim region of the shield, an adhesive removably securing said side wall of the retainer to said inner surface, and a pull tab projecting outwardly from the rim of said retainer beyond the rim of the shield whereby the retainer as a whole may be pulled from the shield to expose the ointment preparatory to application of the apparatus to the eye.

References Cited by the Examiner

UNITED STATES PATENTS

| | | | |
|---|---|---|---|
| 1,955,175 | 4/1934 | Crowther | 206—56 |
| 2,241,415 | 5/1941 | Moulton | 88—54.5 |
| 2,347,488 | 4/1944 | Lawlor et al. | 128—260 X |
| 3,121,511 | 2/1964 | Whitehead | 128—249 |

OTHER REFERENCES

The Dispensatory of the United States of America, 25th Edition, published by J. B. Lippincott Company, Philadelphia, 1955, pages 386, 387, 392, 395 and 396.

ROBERT E. MORGAN, *Acting Primary Examiner.*

RICHARD A. GAUDET, LEWIS GOTTS, *Examiners.*

R. L. HUFF, D. L. TRULUCK, *Assistant Examiners.*